July 25, 1967
M. R. J. WYLLIE
3,332,483
METHOD OF DETERMINING THE VERTICAL VARIATION
OF PERMEABILITY IN A SUBSURFACE FORMATION
Filed Sept. 2, 1964
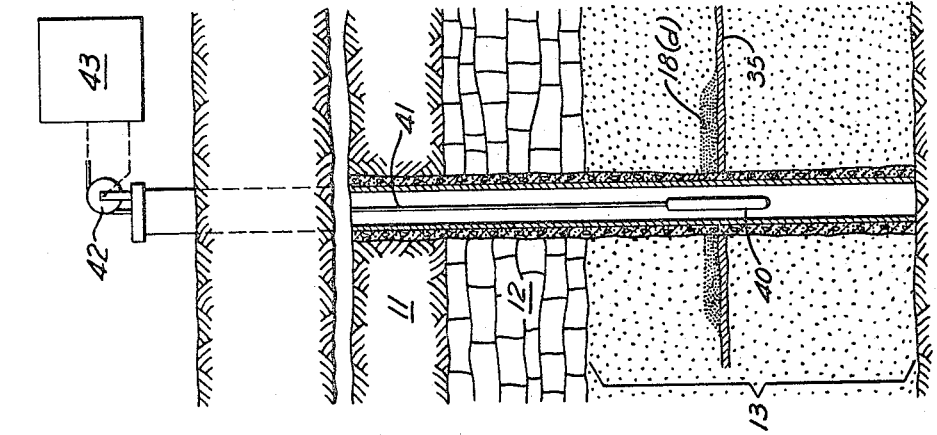
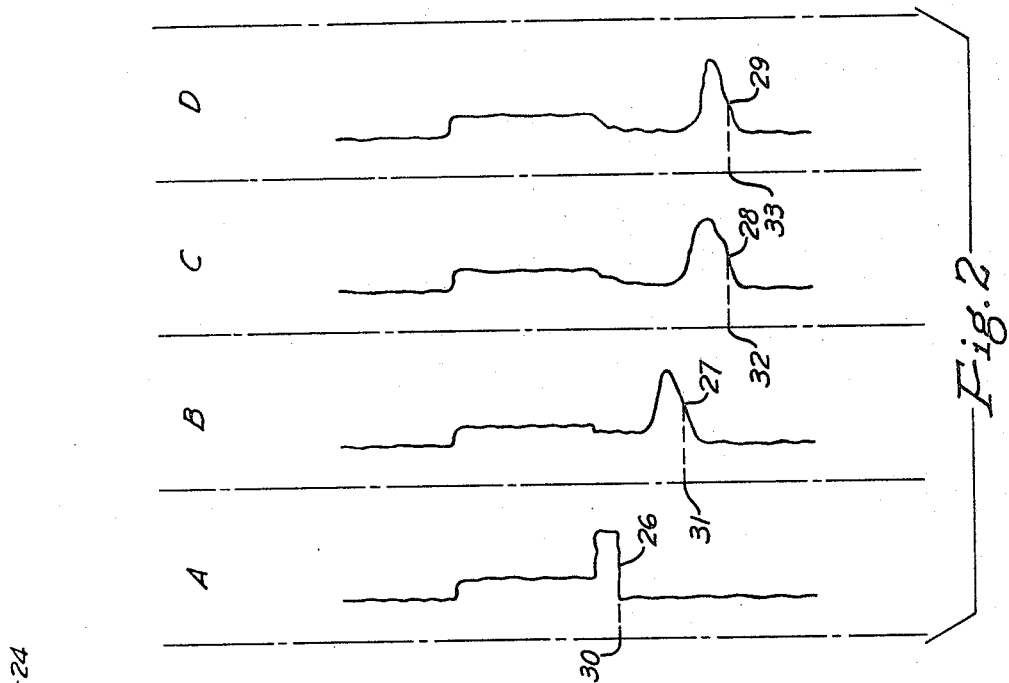
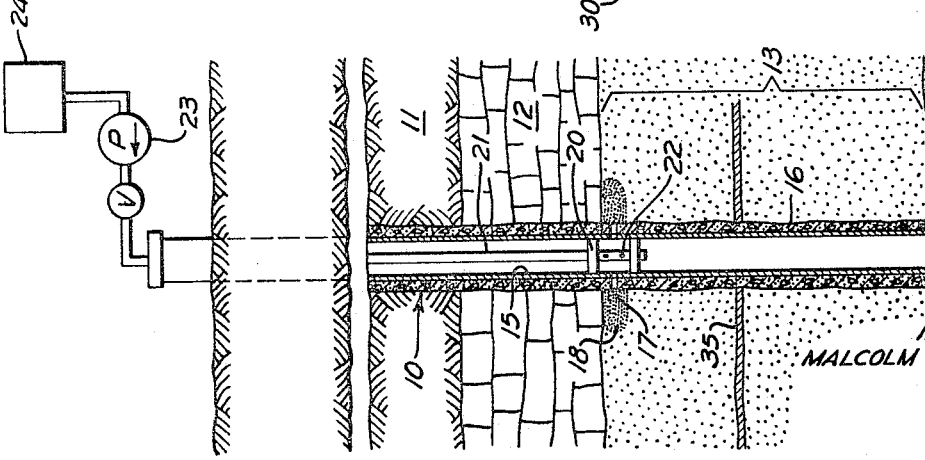
INVENTOR.
MALCOLM R. J. WYLLIE United States Patent Office 3,332,483
Patented July 25, 1967

3,332,483
METHOD OF DETERMINING THE VERTICAL VARIATION OF PERMEABILITY IN A SUBSURFACE FORMATION
Malcolm R. J. Wyllie, Indiana Township, Allegheny County, Pa., assignor to Gulf Research & Development Company, Pittsburgh, Pa., a corporation of Delaware
Filed Sept. 2, 1964, Ser. No. 393,882
5 Claims. (Cl. 166—4)

This invention relates to the logging of earth formations penetrated by a borehole and in particular concerns a method of logging the relative permeability of the formations in a vertical direction as contrasted to the conventional in-situ permeability measuring methods which measure permeability in a horizontal direction.

In recent years many oil production methods have been employed which depend on flow of oil in a vertical direction. For example, in a gravity-drainage type of production the oil must flow by gravity in a substantially vertical direction to reach the production channels. Also the economics of a miscible-displacement secondary-recovery process is known to depend on the vertical sweep efficiency of the injected material. Inasmuch as most oil-bearing formations do not deviate very much from the horizontal, the above-mentioned processes require the operator to have a knowledge of the vertical permeability of the formation or formations involved. Being sedimentary in origin, oil-bearing formations usually comprise a series of nearly horizontal strata, usually fairly uniform in the horizontal direction, but oftentimes the vertical succession of beds is interspersed with beds of widely different permeability. Because of the manner in which sediments are successively deposited, it is apparent that for any geological formation of substantial thickness whose deposition represents a substantial geological time interval, the permeability will be different in the horizontal and vertical directions, i.e. the permeability is anisotropic. It is apparent that the presence in an otherwise uniform series of sedimentary beds of an impermeable streak will seriously affect the success and economics of any oil-production process that depends on fluid flow across the bedding planes, i.e. that depends on flow which is to an appreciable extent in the vertical direction. It is, therefore, important to determine the permeability of the formations concerned in a vertical direction.

The heretofore known and widely practiced methods of determining in situ the permeability of formations penetrated by a well all measure horizontal permeability. Examples of such techniques are given in United States Patents 2,358,945, 2,364,975, 2,376,878, 2,446,588, 2,557,488, 2,736,197, and many others. However, none of the hertofore-known methods gives any information as to the formation permeability in a vertical direction, and the heretofore-known methods are incapable of ascertaining the presence in the geological sequence of either a thin impermeable or a highly permeable streak. The heretofore-known methods are incapable of measuring in situ the permeability of a formation in the vertical direction.

It is accordingly an object of this invention to provide a method of determining in situ the vertical permeability of the formations penetrated by a well bore.

It is a further object of this invention to provide a method of determining in situ the permeability of the formations penetrated by a well bore in a direction substantially parallel to the axis of the borehole.

These and other useful objects of the invention are attained by the method described in this specification of which the drawings form a part, and in which FIGURE 1 illustrates a well penetrating a formation containing streaks with low permeability;

FIGURE 2 illustrates a sequence of logs taken at successive time intervals in accordance with the teachings of this invention and which show the presence of a low-permeability streak, and FIGURE 3 illustrates the effect of a thin impermeable streak located by application of this invention.

In this invention the depth interval whose vertical permeability is to be determined is provided throughout with casing and the annular space behind the casing is completely sealed with cement as in conventional casing-cementing practice. The casing and cement are then perforated in conventional manner at the top of the depth interval of interest so as to establish communication between the interior of the casing and the adjacent formation. Through the perforations there is then injected into the formation a quantity of a fluid that has a density higher than the formation fluid with respect to which permeability is to be determined, the injected fluid being traceable or having a traceable component so that presence of the injected fluid in the formation can be detected inside the casing. The perforations are then either sealed or the well pressure held so that no flow takes place into or out of the perforations. An appropriate well log is then run inside the casing and repeated at successive time intervals so as to monitor gravity fall of the injected fluid downward through the formation. If the formation permeability is uniform in the vertical direction, the traceable injected component will fall substantially uniformly with time. If a less permeable streak is encountered by the injected fluid, its rate of fall will be slowed; if an impermeable streak is encountered, the rate of fall will be arrested; or if the vertical permeability progressively increases, the injected fluid will fall at an increasing rate, etc. In this manner the suggestion of logs tracing downward movement of the injected fluid will provide the operator with a measure of the distribution of vertical permeability of the formation, i.e. will give a vertical permeability log of the formations adjacent the well bore.

Referring to FIGURE 1, there is illustrated a borehole 10, penetrating formations 11, 12, and 13. Formation 13 is known to be oil-bearing or otherwise of interest as previously determined, for example, from a drill-stem test made during drilling. The borehole is cased with casing 15 carefully cemented throughout the depth interval of formation 13 as indicated by 16. In order to attain a good cement job the casing may be provided with scratchers and centralizers (not shown) and reciprocated and oscillated during placement of the cement as is conventional practice in performing a good cementing operation. After the cement has set, the casing and cement are perforated at 17 by conventional means in order to permit access to the formation. The perforations 17 are made substantially at the top of the formation interval of interest, inasmuch as the determination of vertical permeability will be made in the depth interval immediately below these perforations.

Through the perforations 17 there is injected into the formation a liquid 18 that has a density higher than that of the formation fluid with respect to which permeability of the formation or formations is to be determined. The density of formation fluids may be previously determined by tests on samples obtained from a drill-stem test, or if oil is not present and drill-stem test samples are not available, the formation fluid densities can be estimated from the concentrations of dissolved salts in fluids of similar formations. It is preferred to employ as the injected liquid one that has as high a density contrast as possible with respect to formation fluids. The permeability measured by this invention is the formation vertical permeability to the formation fluid with which the injected heavy liquid is miscible, and the injected liquid must therefore be miscible with only the fluid of concern. By way of example, it is usually desired to determine the vertical permeability to oil of a formation containing both oil and water, and when making such determination by means of this invention, the injected heavy liquid is one that is miscible with oil and not with water, as for example bromoform (s.g. 2.89) or methyl iodide (s.g. 3.33).

The presence of the injected dense liquid behind the casing is detectable, for example, by using a conventional gamma-gamma type of radioactivity log which measures the intensity of gamma rays scattered by the liquid-containing formation when bombarded through the casing by gamma rays from a source in the logging sonde. It is known that such a gamma-gamma log is substantially a density log. Alternatively, a detectable tracer may be dissolved in the heavy injected liquid. For example, $Co^{60}$-napthenate may be employed, this being a gamma-ray emitter whose presence behind the casing can be detected by a simple gamma-ray log. Alternatively, a soluble salt of gadolinium or boron or other element characterized by a high thermal neutron capture cross section in concentration of about 100 p.p.m. in the heavy injected liquid may be employed and detected by means of a conventional neutron log. Any excess heavy liquid remaining in the casing is removed so that only that in the formation behind the casing remains.

The heavy liquid 18, with or without tracer, may be injected in any conventional manner. By way of example, FIGURE 1 shows a straddle packer 20 at the end of tubing 21 arranged so that the bottom of the tubing is closed and the tubing is in communication with the space between the packers through openings 22. The heavy liquid from tank 24 is injected by means of a pump 23 and displaced into the formation by a chaser which may be oil, formation brine, or the like as is conventional. Sufficient quantity of the heavy liquid is injected to be detectable by means of some type of logging technique. It is preferred that the perforations 17 be substantially uniformly distributed in azimuth so that the injected liquid will form an annular ring substantially entirely surrounding the well and thereby be more readily detectable through the casing. Any excess heavy liquid is removed from inside the casing.

After the desired quantity of heavy liquid 18 has been injected into the top of the depth interval under test, the perforations 17 are sealed with conventional materials, as for example cement. Alternatively, the well may be pressurized so that there is no interchange of fluid between the casing and the formation. An appropriate type of log of the depth interval under test is then made, the type of log being predetermined by the type of heavy liquid or tracer employed. Thus, for example, if the heavy liquid comprises methyl iodide which has a high density, is is preferred to run a gamma-gamma type of density log. A first log is made immediately after the heavy liquid has been injected and the perforations sealed, and the log is repeated at appropriate subsequent time intervals to detect downward movement of the heavy liquid 18 under the influence of gravity. As previously indicated, the casing 16 should have a substantially perfect cement job in order that the heavy liquid shall not bypass the formation through channels inadvertently left behind the casing 15. Usually the permeability of the formation will be known from laboratory measurements on well cores which represent discrete samples and which may not include the streaks which this invention will detect. If the heavy liquid is found to fall faster than such core tests would indicate, it points toward a leak through a bypass channel in the cement. Usually it will be found that the rate of fall is slower than would be expected from core tests, due to the fact that the actual formation contains streaks of lower than average permeability.

FIGURE 2 shows a series of logs taken at successive times subsequent to injection of the heavy liquid. Ordinarily the rate of descent of the heavy liquid can be computed from the density contrast between the density of the injected heavy liquid and the known density of formation fluids and from the formation permeability as approximated from cores, so that the approximate time interval required to detect the downward movement of the heavy liquid can be estimated, such as, for example, one foot per day. After a time interval such that a reasonable distance of fall will have been expected, as for example after a week or ten days, the log is repeated. Thereafter at successive convenient and more or less equal time intervals, the log is repeated in order to monitor the downward movement of the heavy liquid until the bottom of the formation of interest is reached.

FIGURE 2 illustrates a series of successive logs such as are obtained. Log A is run immediately after injection of the heavy liquid. It is seen that the indication of the bottom edge 26 of the injected liquid is quite sharp and is substantially opposite the perforations 17. Log B is run one time unit later and the indication of the heavy liquid has fallen to position 27. The bottom edge 27 of the heavy liquid indication is somewhat more diffuse on log B due to the fact that the heavy liquid also diffuses away from the borehole and gradually becomes diluted with formation fluids. The rate of fall of the slug of heavy liquid as indicated by the difference in depth of the indications on logs A and B is directly proportional to the vertical permeability of the formation between depths 30 and 31.

Subsequently log C is run, as for example, two time units after the injection of the heavy liquid. By way of example, log C shows that the slug of heavy liquid whose bottom edge is indicated at 28, fell from depth 31 to depth 32 during the time interval between running logs B and C. As illustrated by way of example in FIGURE 2, the latter depth interval is less than the depth interval 30 to 31, and with the logs A, B, and C spaced at equal time intervals, this points to the presence of a strata of reduced permeability. Log D is run a third time unit later, and by way of illustration shows that the slug of heavy liquid, whose bottom edge is indicated at 29 at a depth 33, has not moved downward at all, thus indicating the presence of an impermeable streak 35 where the downward fall of the heavy liquid is arrested as illustrated in FIGURE 3.

FIGURE 3 illustrates the heavy liquid 18(d) hung up on the impermeable streak 35. The heavy liquid indication obtained on log D is somewhat sharper than that obtained on logs B and C indicating that the slug has encountered an impermeable obstruction. A comparison of the depth indications of the heavy liquid slug as shown on logs C and D shows that the bottom edge of the slug as shown on log C at 32 has not fallen during this time interval and remains at depth 33 as shown on log D, from which the operator will infer the presence of impermeable streak 35 at the depth 33. FIGURE 3 also shows the logging tool 40 in the well, the tool being run on conventional logging cable 41 which passes over sheave 42 and connects to logging recorder 43 with rotations of the sheave also being transmitted to the logging recorder in conventional manner.

It is apparent that the situation illustrated in the accompanying figures is illustrative only. In the event that a highly permeable bed is encountered in the formation sequence, the observed downward rate of fall of the slug of heavy liquid through the depth interval that includes the highly permeable streak will be larger, whereas if the heavy liquid encounters a bed of slightly less permeability, the observed downward rate of fall of the slug through such a depth interval will be smaller. It is evident that the degree of resolution obtainable in detecting relatively small variations in permeability (as contrasted to the location of an impermeable bed illustrated in the figures) will depend on the time interval between running the successive logs each of which gives a depth location for the heavy liquid, whereby the difference in depth indications as related to the time interval will result in a permeability determination. It is further evident that the permebility thus determined between successive logging runs will be an average value for the observed depth interval. With other parameters remaining constant, the average permeability over a depth interval is directly proportional to the observed rate of fall of the slug of heavy liquid through the depth interval.

What I claim as my invention is:

1. A method of determining in situ the vertical variation of permeability in a subsurface formation penetrated by a borehole which comprises
   installing and sealing casing against the formation in the borehole throughout the depth interval of interest,
   perforating said casing and seal to establish communication from inside said casing to the formation at the top of the depth interval of interest,
   injecting into the top of the formation via said perforations a liquid that is miscible with the formation liquid with respect to which formation permeability is to be determined and that has a density exceeding that of said formation liquid,
   said injected liquid being characterized by being detectable through the casing and its seal,
   logging the depth interval of interest by means of a log adapted to detect said heavy liquid in the formation, and
   repeating said log at subsequent known time intervals thereby to monitor descent of said heavy liquid.

2. The method of claim 1 wherein said injected liquid comprises bromoform.

3. The method of claim 1 wherein said injected liquid comprises methyl iodide.

4. The method of claim 1 wherein said injected liquid contains a radioactive tracer detectable by said logging method.

5. The method of claim 1 wherein said injected liquid is detected by a density log.

References Cited

UNITED STATES PATENTS

| | | | |
|---|---|---|---|
| 2,358,945 | 9/1944 | Teichmann | 166—4 X |
| 2,947,359 | 8/1960 | Josendal et al. | 166—4 |
| 2,951,535 | 9/1960 | Mihram et al. | 166—4 X |
| 3,158,023 | 11/1964 | Brillant | 73—155 |
| 3,163,211 | 12/1964 | Henley | 166—4 |

CHARLES E. O'CONNELL, *Primary Examiner.*

DAVID H. BROWN, *Examiner.*